US005990070A

United States Patent [19]

Chapman et al.

[11] Patent Number: 5,990,070

[45] Date of Patent: Nov. 23, 1999

[54] SYSTEM FOR DELIVERING HYDROPHOBIC LIQUID BLEACH ACTIVATORS

[75] Inventors: Benjamin Edgar Chapman, Cincinnati; Toan Trinh, Mainesville, both of Ohio

[73] Assignee: The Procter & Gamble Company, Cincinnati, Ohio

[21] Appl. No.: 09/212,073

[22] Filed: Dec. 15, 1998

Related U.S. Application Data

[62] Division of application No. 09/014,144, Jan. 27, 1998, Pat. No. 5,905,067

[60] Provisional application No. 60/036,933, Feb. 10, 1997.

[51] Int. Cl.[6] .......................... C11D 17/06; C11D 3/395; C11D 7/18; C11D 7/54; A01N 3/00

[52] U.S. Cl. .......................... 510/349; 510/220; 510/312; 510/376; 252/186.38

[58] Field of Search .................................... 510/349, 376, 510/312, 220; 252/186.38

[56] References Cited

U.S. PATENT DOCUMENTS

| | | | |
|---|---|---|---|
| 3,441,507 | 4/1969 | Schiefer | 252/95 |
| 3,494,786 | 2/1970 | Nielsen | 117/100 |
| 3,494,787 | 2/1970 | Lund | 117/100 |
| 3,971,852 | 7/1976 | Brenner et al. | 426/103 |
| 4,087,369 | 5/1978 | Wevers | 252/102 |
| 4,207,199 | 6/1980 | Perner | 252/174 |
| 4,290,903 | 9/1981 | Macgilp et al. | 252/91 |
| 4,399,049 | 8/1983 | Gray et al. | 252/91 |
| 4,444,674 | 4/1984 | Gray | 252/95 |
| 4,545,784 | 10/1985 | Sanderson | 8/107 |
| 4,946,624 | 8/1990 | Michael | 252/315.2 |
| 5,102,564 | 4/1992 | Gardlik et al. | 252/8.9 |
| 5,232,612 | 8/1993 | Trinh et al. | 252/8.6 |
| 5,232,613 | 8/1993 | Bacon et al. | 252/8.6 |
| 5,234,611 | 8/1993 | Trinh et al. | 252/8.8 |
| 5,236,615 | 8/1993 | Trinh et al. | 252/174.11 |
| 5,267,531 | 12/1993 | Appel et al. | 119/171 |
| 5,269,962 | 12/1993 | Brodbeck et al. | 252/186.25 |
| 5,405,413 | 4/1995 | Willey | 8/111 |
| 5,503,639 | 4/1996 | Willey | 8/111 |
| 5,534,195 | 7/1996 | Chapman et al. | 510/444 |
| 5,534,196 | 7/1996 | Chapman et al. | 252/186.27 |
| 5,814,592 | 9/1998 | Kahn et al. | 510/304 |
| 5,872,092 | 2/1999 | Kong-Chan et al. | 510/413 |

FOREIGN PATENT DOCUMENTS

| | | | |
|---|---|---|---|
| 0 106 634 | 4/1984 | European Pat. Off. | C11D 3/39 |
| 1398785 | 6/1975 | United Kingdom | D06L 3/02 |
| 1441416 | 6/1976 | United Kingdom | D06L 3/00 |

*Primary Examiner*—Yogendra Gupta
*Assistant Examiner*—John M Petruncio
*Attorney, Agent, or Firm*—R. S. Echler, Sr.; K. W. Zerby; J. C. Rasser

[57] ABSTRACT

The present invention relates to a system for delivering liquid bleach activators to solid or granular peroxygen bleach containing compositions. The preferred delivery system is liquid activators complexed with a cyclodextrin. preferably beta-cyclodextrin. The present invention also relates to a method for preparing the liquid bleach activator/ cyclodextrin complexes described herein.

20 Claims, No Drawings

SYSTEM FOR DELIVERING HYDROPHOBIC LIQUID BLEACH ACTIVATORS

CROSS REFERENCE

This application claims priority under Title 35, United States Code 119(e) from Provisional Application Ser. No. 60/036,933, filed Feb. 10, 1997. This is a divisional of application Ser. No. 09/014,144 filed Jan. 27, 1998, now U.S. Pat. No. 5,905,067.

FIELD OF THE INVENTION

The present invention relates to a system for delivering hydrophobic bleach activators to bleaching compositions which are suitable for use in cleaning products inter alia granular laundry detergents, granular automatic dishwasher detergents, granular hard surface cleaners and laundry bars

BACKGROUND OF THE INVENTION

The formulation of detergent compositions which effectively remove a wide variety of soils and stains from fabrics under wide-ranging usage conditions remains a considerable challenge to the laundry detergent industry, in both granular detergents as well as laundry bars. Challenges are also faced by the formulator of automatic dishwashing detergent compositions (ADD's), which are expected to efficiently cleanse and sanitize dishware, often under heavy soil loads. In addition, hard surface cleaners are formulated to sanitize as well as to clean, thereby increasing the need for more potent ingredients in their formulations.

Most conventional cleaning compositions contain mixtures of various detersive surfactants to remove a wide variety of soils and stains from surfaces. In addition, various detersive enzymes, soil suspending agents, phosphorous based and non-phosphorous builders, optical brighteners, and in the case of hard surface cleaners, abrasive materials, are added to boost overall cleaning performance. Many filly-formulated cleaning compositions contain oxygen bleach, which can be a perborate or percarbonate compound. While quite effective at high temperatures, perborates and percarbonates loose much of their bleaching function at low to moderate temperatures increasingly favored in consumer product use. Accordingly, various bleach activators such as tetraethylenediamine (TEAD) and nonanoyloxybenezene-sulfonate (NOBS) have been developed to potentiate the bleaching action of perborate and percarbonate across a wide temperature range.

Most of these prior art bleach activators are solids and are intended primarily as adjuncts to conventional laundry detergent granules. Such laundry granules typically comprise a solid bleach activator in admixture with a coating or carrier material which serves to enhance the stability of the bleach activator and to facilitate its uniform dispersion in the granular detergent. Different from the solid bleach activators known heretofore. another class of bleach activators which have now been found to provide good bleaching of textiles and fabrics, especially on hydrophobic stains, are hydrophobic liquid bleach activators. Such liquid bleach activators are often substantially water-insoluble and can be difficult to use in granular cleaning compositions or bars because they are oily, hydrophobic liquids at ambient temperatures and tend not to solubilize/disperse satisfactorily in the wash water. Indeed, in the case of laundry detergents, an unsolubilized liquid bleach activator can separate from the wash liquor as an oily liquid and fail to be converted to peracids, or can even ultimately cling to the fabrics in the wash where they react with the peroxygen bleach and spot or remove color from the fabrics.

Therefore, the need remains for a suitable liquid bleach activator delivery system for granular or solid laundry detergent compositions.

BACKGROUND ART

The following relate to bleach activators and/or cleaning compositions comprising bleach activators: U.S. Pat. No. 3,441,507 Schiefer et al., issued Apr. 29, 1969; U.S. Pat. No. 3,494,786 Nielsen, issued Feb. 10, 1970; U.S. Pat. No. 3,494,787 Lund et al., issued Feb. 10, 1970; U.S. Pat. No. 4,087,369 Wevers, issued May 2, 1978; U.S. Pat. No. 4,207,199 Perner et al., issued Jun. 10, 1980; U.S. Pat. No. 5,405,413 Willey et al., issued Apr. 11, 1995; U.S. Pat. No. 5,503,639 Willey et al., issued Apr. 2, 1996; U.S. Pat. No. 5,534,195 Chapman et al., issued Jul. 9, 1996; G. B. 1,398,785 laid open Jun. 25, 1975; and G. B. 1,441,416 laid open Jun. 30, 1976.

SUMMARY OF THE INVENTION

It has now been surprisingly discovered that hydrophobic liquid bleach activators such as octanoyl caprolactam, octanoyl valerolactam, nonanoyl caprolactam, nonanoyl valerolactam and N-nonanoyl-N-methylacetamide can be suitably formulated into granular cleaning compositions or laundry bars by first forming a dry granular moisture-activated microcapsules or cyclodextrin complex comprising the liquid hydrophobic bleach activator and a suitable carrier such as cyclodextrin, cellular matrix starch microcapsules, hydrophilic porous particles, e.g., starch granules, zeolites, silica particles, and the like. These delivery systems can be formulated into granular laundry detergents, granular automatic dishwashing detergent (ADD) compositions, hard surface cleaning compositions such as scouring powders as well as laundry bars.

In addition to the stability of the liquid bleach activator in the powder form, this system is also able to slowly release the bleach activator material in manner which allows the bleach activator to be present during all phases of the wash cycle. This is especially critical in the case of laundry bars, scouring powders and cleaners. The initial release of the liquid activator is stimulated by the presence of water, however, if the supply of water is limited then the release of bleach activator is retarded. This allows the consumer to wet down a surface, apply the laundry bar or cleaning powder and work the solution into a paste. As the paste is worked through the soap scum, water scale and grime, the addition of fresh water increases the supply of bleach activator which in turn acts to increase the amount of active bleach present.

The present invention relates to bleach-containing granular or solid laundry detergent compositions comprising:

a) at least 0.01%, preferably from about 1% to about 30%, more preferably from about 3% to about 25% by weight, of a bleaching system comprising:
   i) a moisture-activated hydrophobic liquid bleach activator delivery system, said delivery system selected from the group consisting of cyclodextrin inclusion complexes, cellular matrix microcapsules, hydrophilic porous particles, and mixtures thereof, preferably a cyclodextrin inclusion complex, cellular matrix microcapsule, more preferably a beta-cyclodextrin inclusion complex;
   ii) a source of hydrogen peroxide;

b) at least 0.01%, preferably from about 0.1% to about 30%, more preferably from about 1% to about 20% by weight, of a detersive surfactant, said detersive surfactant selected from the group consisting of anionic surfactants, nonionic surfactants, and mixtures thereof;

c) optionally at least about 0.005% of a dispersion which is intimately blended with the liquid bleach activator or liquid bleach activator delivery system; and d) the balance carriers and other adjunct materials, said adjunct ingredients selected from the group consisting of builders, optical brighteners, bleach boosters, dye transfer agents, dispersents, soil release agents, suds suppressers, chelants, proteases, lipases, cellulases, dyes, perfumes, colorants, filler salts, hydrotropes, and mixtures thereof; wherein when liquid bleach activator is complexed with a cyclodextrin the molar ratio of liquid bleach activator to cyclodextrin is from about 1.5:1 to about 1:2.

The present invention also relates to hard surface cleaning compositions which comprise moisture-activated hydrophobic liquid bleach activator microcapsules, preferably, hydrophobic liquid bleach activator/cyclodextrin inclusion complexes.

The present invention further relates to methods for forming cyclodextrin/liquid bleach activator inclusion complexes suitable for use in granular or solid cleaning compositions.

It is therefore an object of the present invention to provide a moisture-activated hydrophobic liquid bleach activator delivery system useful for granular cleaning and laundry bar compositions wherein the moisture-activated hydrophobic liquid bleach activator-containing bleaching system is in the form of a cyclodextrin inclusion complex, a cellular matrix microcapsule, of a hydrophilic porous particle said system acts to release the hydrophobic liquid bleach activator upon contact with water.

It is also an object of the present invention to provide a method for stabilizing hydrophobic liquid bleach activators so that the liquid bleach activator described herein can be used in solid or granular cleaning compositions.

It is a further object of the present invention to provide an efficient and useful delivery system for hydrophobic liquid bleach activators.

All percentages, ratios and proportions herein are by weight, unless otherwise specified. All temperatures are in degrees Celsius (° C.) unless otherwise specified. All documents cited are in relevant part, incorporated herein by reference.

DETAILED DESCRIPTION OF THE INVENTION

The present invention relates to a delivery system for hydrophobic liquid bleach activators useful for formulating liquid bleach activators into non-liquid cleaning compositions. The delivery systems according to the present invention include molecular as well as micro encapsulation. For the purposes of the present invention "cyclodextrin inclusion complexes" are considered to be a form of molecular encapsulations The systems described herein are useful in formulating laundry detergent formulations, laundry presoak formulations, laundry bar formulations, automatic dishwasher formulations, or hard surface cleaning compositions. The hard surface cleaning compositions include compositions both with or without abrasive materials for scouring.

Hydrophobic Liquid Bleach Activator Delivery Systems

The liquid bleach activator delivery systems according to the present invention are selected from the group consisting of cyclodextrin inclusion complexes, cellular matrix microcapsules, hydrophilic porous particles filled with liquid bleach activators, and mixtures thereof, preferably a cyclodextrin inclusion complex, cellular matrix microcapsule, more preferably a beta-cyclodextrin inclusion complex.

The hydrophobic liquid bleach activator delivery systems of the present invention comprise at least one liquid bleach activator in combination with a material that renders the liquid bleach activator useful in a dry, granular or solid cleaning composition. Non-limiting examples of these suitable forms are molecular encapsulation products, inclusion complexes, or micro encapsulation products all of which are considered to be moisture-activated hydrophobic liquid bleach activator microcapsules. For the purpose of the present invention the term "moisture-activated hydrophobic liquid bleach activator microcapsule" is defined as one or more hydrophobic liquid bleach activator in combination with a cyclodextrin as a cyclodextrin inclusion complex, or as a cellular matrix, or as a hydrophilic porous particle filled with the hydrophobic liquid bleach activator.

Hydrophobic Liquid Bleach Activators

Any hydrophobic liquid bleach activator is suitable for use in the present invention provided said liquid bleach activator forms a cyclodextrin inclusion complex, or can be included in a cellular matrix microcapsule, or a hydrophilic porous particle.

Preferred liquid bleach activators include the acyl lactam bleach activators having the formula:

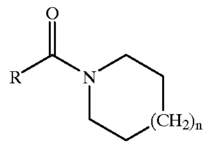

wherein R is $C_1$–$C_{11}$ linear and branched alkyl; n is from 0 to 4, preferably 1 (valerolactam) and 2 (caprolactam). Examples of hydrophobic liquid lactam bleach activators include hexanoyl caprolactam, hexanoyl valerolactam, octanoyl caprolactam, octanoyl valerolactam, nonanoyl caprolactam, nonanoyl valerolactam, isononanoyl caprolactam, isononanoyl caprolactam, isononanoyl valerolactam, decanoyl caprolactam. decanoyl valerolactam, undecanoyl caprolactam, undecanoyl valerolactam, 3,5,5-trimethylhexanoyl caprolactam, 3,5,5-trimethylhexanoyl valerolactam, and mixtures thereof.

Another class of preferred hydrophobic liquid bleach activators are the liquid Imide Bleach Activators having the formula

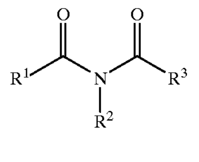

wherein $R^1$ is a $C_7$–$C_{13}$ linear or branched chain saturated or unsaturated alkyl group, preferably $C_7$–$C_{13}$ linear or branched chain saturated alkyl group, more preferably $C_7$–$C_9$ linear alkyl, most preferably $C_8$ such that the $R^1$ moiety together with the carbonyl group form a nonanoyl moiety; $R^2$ is a $C_1$–$C_2$ alkyl group, preferably methyl; and $R^3$ is a $C_1$–$C_2$ alkyl group; preferably methyl. More preferred are the N-acyl-N-methylacetamides, namely, N-octanoyl-N-methyl acetamide, N-nonanoyl-N-methyl acetamide, N-decanoyl-N-methyl acetamide and N-dodecanoyl-N-methyl acetamide.

However, this list is not meant to be inclusive or exclusive and any hydrophobic liquid bleach activator may be suitably combined with the cyclodextrins listed herein below.

For the purposes of the present invention the term "hydrophobic liquid bleach activator" is defined as liquid bleach activators having a ClogP value greater than or equal to 1.

Determination of ClogP

The hydrophobic liquid bleach activators of the present invention are characterized by the calculated logarithm of their octanol/water partition coefficient, ClogP. The ClogP of the hydrophobic liquid bleach activators as described above is used to determine the suitability of a liquid bleach activator for use in the present invention. The octanol/water partition coefficient of a selected hydrophobic liquid bleach activator species is the ratio between its equilibrium concentration in octanol and in water. Since the partition coefficients are frequently large, they are more conveniently given in the form of their logarithm to the base 10, logP.

The logP of some hydrophobic liquid bleach activators species has been reported; for example, the Ponmona92 database, available from Daylight Chemical Information Systems, Inc. (Daylight CIS), contains many, along with citations to the original literature.

However, the logP values are most conveniently calculated by the "CLOGP" program, also available from Daylight CIS. This program also lists experimental logP values when they are available in the Pomona92 database. The "calculated logP" (ClogP) is determined by the fragment approach of Hansch and Leo (cf., A. Leo, in Comprehensive Medicinal Chemistry, Vol. 4, C. Hansch. P. G. Sammens, J. B. Taylor and C. A. Ransden, Eds., p. 295, Pergamon Press, 1990, incorporated herein by reference). The fragment approach is based on the chemical structure of each HR species, and takes into account the numbers and types of atoms, the atom connectivity, and chemical bonding. ClogP values are the most reliable and widely used estimates for octanol water partitioning. It will be understood by those skilled in the art that experimental log P values could also be used. Experimental log P values represent a less preferred embodiment of the invention. Where experimental log P values are used, the one hour log P values are preferred.

The compounds of the present invention comprise hydrophobic liquid bleach activators having a ClogP value equal to or greater than 1, preferably, greater than 2, more preferably greater than 3, most preferably greater than 4.

Cyclodextrin Complexing Agent

As used herein, the term "cyclodextrin" (CD) includes any of the known cyclodextrins such as unsubstituted cyclodextrins containing from six to twelve glucose units, especially, alpha-, beta-, gamma-cyclodextrins, and mixtures thereof, and/or their derivatives, and/or mixtures thereof, that are capable of forming inclusion complexes with liquid acyl lactam bleach activators. The specific coupling and conformation of the glucose units give the cyclodextrins a rigid, conical molecular structure with a hollow interior of a specific volume. The "lining" of the internal cavity is formed by hydrogen toms and glycosidic bridging oxygen atoms, therefore this surface is fairly hydrophobic. The unique shape and physical-chemical properties of the cavity enable the cyclodextrin molecules to absorb (form inclusion complexes with) organic molecules such as liquid bleach activator molecules which can fit into the cavity. The bleach activator/cyclodextrin complex is thus an example of molecular encapsulation. The loading of liquid bleach activator in cyclodextrin complexes is about 8% to about 18%.

Beta-cyclodextrin is the most preferred cyclodextrin and the one whose complex benefits most from its affinity to form inclusion complexes. Alpha-, beta-, and gamma-cyclodextrins can be obtained from, among others, Cerestar USA, Inc., Hammond, Ind. and Wacker Chemicals (USA), Inc., New Canaan, Conn. There are many derivatives of cyclodextrins that are known. Representative derivatives are those disclosed in U.S. Pat. No. 3,426,011, Parmerter et al., issued Feb. 4, 1969; U.S. Pat. Nos. 3,453,257, 3,453,258, 3,453,259, and 3,453,260, all in the names of Parmerter et al., and all issued Jul. 1, 1969; U.S. Pat. No. 3,459,731, Gramera et al., issued Aug. 5, 1969; U.S. Pat. No. 3,553,191, Parmerter et al., issued Jan. 5, 1971; U.S. Pat. No. 3,565,887, Parmerter et al., issued Feb. 23, 1971; U.S. Pat. No. 4,535,152, Szejtli et al., issued Aug. 13, 1985; U.S. Pat. No. 4,616,008, Hirai et al., issued Oct. 7, 1986; U.S. Pat. No. 4,638,058, Brandt et al., issued Jan. 20, 1987; U.S. Pat. No. 4,746,734, Tsuchiyama et al., issued May 24, 1988; and U.S. Pat. No. 4,678,598, Ogino et al., issued Jul. 7, 1987, all of said patents being incorporated herein by reference. Examples of cyclodextrin derivatives suitable for use herein are methyl-b-CD, hydroxyethyl-b-CD, and hydroxypropyl-b-CD of different degrees of substitution (DS), available from, among others, Cerestar USA Inc., Hammond, Ind., Aldrich Chemical Company, Milwaukee, Wis.; Wacker Chemicals (USA). New Canaan, Conn.; and Chinoin Pharmaceutical Works, Budapest, Hungary. Water-soluble derivatives are also highly desirable.

The individual cyclodextrins can also be linked together, e.g., using multifunctional agents to form oligomers, polymers, etc. Examples of such materials are available commercially from Cerestar USA and from Aldrich Chemical Company (b-CD/epichlorohydrin copolymers).

It is also desirable to use mixtures of cyclodextrins to provide a mixture of complexes. Mixtures of cyclodextrins can conveniently be obtained by using intermediate products from known processes for the preparation of cyclodextrins including those processes described in U.S. Pat. No. 3,425,910, Armbruster et al., issued Feb. 4, 1969; U.S. Pat. No. 3,812,011, Okada et al., issued May 21, 1974; U.S. Pat. No. 4,317,881, Yagi et al., issued Mar. 2, 1982; U.S. Pat. No. 4,418,144, Okada et al., issued Nov. 29, 1983; and U.S. Pat. No. 4,738,923, Ammeraal, issued Apr. 19, 1988, all of said patents being incorporated herein by reference. Preferably at least a major portion of the cyclodextrins are alpha-cyclodextrin, beta-cyclodextrin. and/or gamma-cyclodextrin, more preferably beta-cyclodextrin. Some cyclodextrin mixtures are commercially available from, e.g., Ensuiko Sugar Refining Company, Yokohama, Japan.

When formulated into hard surface cleaning compositions having an abrasive material component, cyclodextrins can serve as an adjunct abrasive material. Before and after the liquid acyl lactam bleach activator has been released into the surrounding aqueous medium, the cyclodextrin particles themselves may serve as an adjunct abrasive material. Additional cyclodextrin beyond the amount necessary to form an inclusion complex with the liquid bleach activator may be added. However, the formulator may suitably use particle sizes of cyclodextrin which do not serve as an abrasive material as the carrier complex for the liquid bleach activators.

Moisture-Activated Cellular Microcapsules

Water-soluble cellular matrix microcapsules of hydrophobic liquid bleach activator are solid particles containing liquid bleach activator held in a stable manner within the cells. The water-soluble matrix material comprises mainly polysaccharide and polyhydroxy compounds. The polysaccharides are preferably higher polysaccharides of the non-sweet, colloidal-soluble types, such as natural gums, e.g., gum arabic, starch derivatives, dextrinized and hydrolyzed starches, and the like. The polyhydroxy compounds are preferably alcohols, plant-type sugars, lactones, monoethers, and acetals. The cellular matrix microcapsules useful in the present invention are prepared by, e.g., (1) forming an aqueous phase of the polysaccharide and polyhydroxy compound in proper proportions, with added emulsifier if necessary or desirable; (2) emulsifying the liquid hydrophobic bleach activator in the aqueous phase; and (3) removing moisture while the mass is plastic or flowable, e.g., by spray drying droplets of the emulsion. The matrix materials and process details are disclosed in, e.g., U.S. Pat. No. 3,971,852, Brenner et al., issued Jul. 27, 1976, which is incorporated herein by reference. The cellular microcapsules are preferred for their liquid bleach activator loading which can be as high as 50–80%.

Moisture-activated microcapsules of the cellular type can be obtained commercially, e.g., as IN-CAP® from Polak's Frutal Works, Inc., Middletown, N.Y.; and as Optilok System® from Encapsulated Technology, Inc., Nyack, N.Y.

Water-soluble cellular matrix microcapsules preferably have size of from about 5 micron to about 500 microns, more preferably from about 10 micron to about 300 microns, most preferably from about 20 microns to about 200 microns.

Cruder starch matrix particles can be prepared according to the disclosure in U.S. Pat. No. 5,267,531, Appel et al., issued Dec. 7, 1993, said patent being incorporated herein by reference. The liquid hydrophobic bleach activator is emulsified with various starches and water for a period of two hours. The emulsion is then spray dried and checked for proper oil content.

Hydrophilic Porous Particles

Hydrophilic porous particles can also be used to retain the liquid hydrophobic bleach activator in the dry powdery state and release it slowly in use. Nonlimiting examples of such hydrophilic porous particles are starch granules, silica aggregates, and the like. An example of porous starch granules is disclosed by Whistler et al in Food Technology, July 1994, pp. 104–105, incorporated wherein by reference. Examples of porous amorphous silica include Syloid and Cab-O-Sil. A preferred porous amorphous silica is Syloid 244. The liquid bleach activator is filled into the porous granules and is retained. The bleach activator loading can be as high as about 30% to about 50%. The bleach activator is released upon wetting. The preferred particle size is from about 10 microns to about 100 microns.

Hydrogen Peroxide Source

The detergent compositions herein comprise a bleach system having an activator/cyclodextrin inclusion complex and a source of hydrogen peroxide. The source of hydrogen peroxide is hereinafter known as the "bleaching agent". These bleaching agents are not hypohalites, but instead are perborates, percarbonates, peracids, hydrogen peroxide, etc., which are described herein as oxidative-type bleaching agents. The bleaching agents will typically be at levels of from about 1% to about 30%, more typically from about 2% to about 20%, of the detergent composition, especially for fabric laundering. However, granular laundry detergent compositions formulated for use in hand washing of fabric, typically from about 2% to about 4% of the composition comprises said oxidative-type bleaching agents. The amount of hydrophobic liquid bleach activator/cyclodextrin inclusion complex present will provide an amount of bleach activator typically from about 20% to about 200%, more typically from about 50% to about 100% of the source of hydrogen peroxide or "bleaching agent".

The bleaching agents used herein can be any of the bleaching agents useful for detergent compositions in textile cleaning, hard surface cleaning, or other cleaning purposes that are now known or become known. These include oxygen bleaches as well as other bleaching agents. Perborate bleaches, e.g., sodium perborate (e.g., mono- or tetra-hydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxydodecanedioic acid. Such bleaching agents are disclosed in U.S. Pat. No. 4,483,781. Hartman, issued Nov. 20, 1984, U.S. patent application Ser. No. 740,446, Burns et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid as described in U.S. Pat. No. 4,634,551, issued Jan. 6, 1987 to Burns et al.

Peroxygen bleaching agents can also be used. Suitable peroxygen bleaching compounds include sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commercially by DuPont) can also be used.

A preferred percarbonate bleach comprises dry particles having an average particle size in the range from about 500 micrometers to about 1,000 micrometers. not more than about 10% by weight of said particles being smaller than about 200 micrometers and not more than about 10% by weight of said particles being larger than about 1,250 micrometers. Optionally, the percarbonate can be coated with silicate. borate or water-soluble surfactants. Percarbonate is available from various commercial sources such as FMC, Solvay and Tokai Denka.

Mixtures of bleaching agents can also be used.

Surfactant systems

The instant cleaning compositions contain at least about 0.01% by weight of a surfactant selected from the group consisting of anionic, nonionic, ampholytic and zwitterionic surface active agents. Preferably the solid (i.e. granular) and viscous semi-solid (i.e. gelatinous, pastes, etc.) systems of the present invention, surfactant is preferably present to the extent of from about 0. 1% to 30% by weight of the composition.

Nonlimiting examples of surfactants useful herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M+)\ CH_3$ and $CH_3\ (CH_2)_y(CHOSO_3^-M^+)\ CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides are highly preferred, especially the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are described further herein and are listed in standard texts.

Anionic surfactants can be broadly described as the water-soluble salts, particularly the alkali metal salts, of organic sulfuric reaction products having in their molecular structure an alkyl radical containing from about 8 to about 22 carbon atoms and a radical selected from the group consisting of sulfonic acid and sulfuric acid ester radicals. (Included in the term alkyl is the alkyl portion of higher acyl radicals.) Important examples of the anionic synthetic detergents which can form the surfactant component of the compositions of the present invention are the sodium or potassium alkyl sulfates, especially those obtained by sulfating the higher alcohols (C8–18 carbon atoms) produced by reducing the glycerides of tallow or coconut oil; sodium or potassium alkyl benzene sulfonates, in which the alkyl group contains from about 9 to about 15 carbon atoms, (the alkyl radical can be a straight or branched aliphatic chain); sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid ester of the reaction product of one mole of a higher fatty alcohol (e.g. tallow or coconut alcohols) and about 1 to about 10 moles of ethylene oxide; sodium or potassium salts of alkyl phenol ethylene oxide ether sulfates with about 1 to about 10 units of ethylene oxide per molecule and in which the alkyl radicals contain from 8 to 12 carbon atoms; the reaction products of fatty acids are derived from coconut oil sodium or potassium salts of fatty acid amides of a methyl tauride in which the fatty acids, for example, are derived from coconut oil and sodium or potassium beta-acetoxy- or beta-acetamido-alkanesulfonates where the alkane has from 8 to 22 carbon atoms.

Additionally, secondary alkyl sulfates may be used by the formulator exclusively or in conjunction with other surfactant materials and the following identifies and illustrates the differences between sulfated surfactants and otherwise conventional alkyl sulfate surfactants. Non-limiting examples of such ingredients are as follows.

Conventional primary alkyl sulfates (AS), such as those illustrated above, have the general formula ROSO3−M+ wherein R is typically a linear C8–22 hydrocarbyl group and M is a water solublizing cation. Branched chain primary alkyl sulfate surfactants (i.e., branched-chain "PAS") having 8–20 carbon atoms are also know; see, for example, Eur. Pat. Appl. 439,316, Smith et al., filed Jan. 21, 1991.

Conventional secondary alkyl sulfate surfactants are those materials which have the sulfate moiety distributed randomly along the hydrocarbyl "backbone" of the molecule. Such materials may be depicted by the structure $$CH_3(CH_2)_n(CHOSO_3^-M^+)(CH_2)_mCH_3$$

wherein m and n are integers of 2 of greater and the sum of m+n is typically about 9 to 17, and M is a water-solublizing cation.

The aforementioned secondary alkyl sulfates are those prepared by the addition of $H_2SO_4$ to olefins. A typical synthesis using alpha olefins and sulfuric acid is disclosed in U.S. Pat. No. 3,234,258, Morris, issued Feb. 8, 1966 or in U.S. Pat. No. 5,075,041, Lutz, issued Dec. 24,1991. See also U.S. Pat. No. 5,349,101, Lutz et al., issued Sept. 20, 1994; U.S. Pat. No. 5,389,277, Prieto, issued Feb. 14, 1995.

The preferred compositions of the present invention also comprise at least about 0.01%, preferably at least 0.1%, more preferably from about 1% to about 95%, most preferably from about 1% to about 80% by weight, of an nonionic detersive surfactant. Preferred nonionic surfactants such as $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), block alkylene oxide condensate of $C_6$ to $C_{12}$ alkyl phenols, alkylene oxide condensates of $C_8$–$C_{22}$ alkanols and ethylene oxide/propylene oxide block polymers (Pluronic™-BASF Corp.), as well as semi polar nonionics (e.g., amine oxides and phosphine oxides) can be used in the present compositions. An extensive disclosure of these types of surfactants is found in U.S. Pat. No. 3,929,678, Laughlin et al., issued Dec. 30, 1975, incorporated herein by reference.

Alkylpolysaccharides such as disclosed in U.S. Pat. No. 4,565,647 Llenado (incorporated herein by reference) are also preferred nonionic surfactants in the compositions of the invention.

More preferred nonionic surfactants are the polyhydroxy fatty acid amides having the formula:

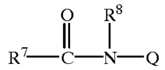

wherein $R^7$ is $C_5$–$C_{31}$ alkyl, preferably straight chain $C_7$–$C_{19}$ alkyl or alkenyl, more preferably straight chain $C_9$–$C_{17}$ alkyl or alkenyl, most preferably straight chain $C_{11}$–$C_{15}$ alkyl or alkenyl, or mixtures thereof; $R^8$ is selected from the group consisting of hydrogen, $C_1$–$C_4$ alkyl, $C_1$–$C_4$ hydroxyalkyl, preferably methyl or ethyl, more preferably methyl. Q is a polyhydroxyalkyl moiety having a linear alkyl chain with at least 3 hydroxyls directly connected to the chain, or an alkoxylated derivative thereof; preferred alkoxy is ethoxy or propoxy, and mixtures thereof Preferred Q is derived from a reducing sugar in a reductive amination reaction. More preferably Q is a glycityl moiety. Suitable reducing sugars include glucose, fructose, maltose, lactose, galactose, mannose, and xylose. As raw materials. high dextrose corn syrup, high fructose corn syrup, and high maltose corn syrup can be utilized as well as the individual sugars listed above. These corn syrups may yield a mix of sugar components for Q. It should be understood that it is by no means intended to exclude other suitable raw materials. Q is more preferably selected from the group consisting of $—CH_2(CHOH)_nCH_2OH$, $—CH(CH_2OH)(CHOH)_{n-1}CH_2OH$, $—CH_2(CHOH)_2—(CHOR')(CHOH)CH_2OH$, and alkoxylated derivatives thereof, wherein n is an integer from 3 to 5, inclusive, and R' is hydrogen or a cyclic or aliphatic monosaccharide. Most preferred substituents for the Q moiety are glycityls wherein n is 4, particularly $CH_2(CHOH)_4CH_2OH$.

$R^7CO-N<$ can be, for example, cocamide, stearamide, oleamide, lauramide, myristamide, capricamide. palmitamide, tallowamide, etc.

$R^8$ can be, for example, methyl, ethyl, propyl, isopropyl, butyl, 2-hydroxy ethyl, or 2-hydroxy propyl.

Q can be 1-deoxyglucityl, 2-deoxyfructityl, 1-deoxymaltityl, 1-deoxylactityl, 1-deoxygalactityl, 1-deoxymannityl, 1-deoxymaltotriotityl, etc.

A particularly desirable surfactant of this type for use in the compositions herein is alkyl-N-methyl glucomide, a compound of the above formula wherein $R^7$ is alkyl (preferably $C_{11}$–$C_{17}$). $R^8$, is methyl and Q is 1-deoxyglucityl.

Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used.

ADJUNCT INGREDIENTS

Dispersion Aid

The liquid bleach activator/cyclodextrin complex, and the liquid bleach activator in other moisture activated microcapsules can optionally but preferably be blended with a dispersion aid to help dispersing the bleach activator when it is released in the wash water, and thus, eliminating or minimizing fabric spotting.

A suitable dispersion aid can be emulsifiers and/or detersive surfactants. Mixtures of emulsifiers and detersive surfactants are also preferred. Suitable surfactants for use with the cyclodextrin complex are nonionic surfactants, cationic surfactants, amphoteric surfactants, zwitterionic surfactants, and mixtures thereof, as given herein above, preferably sodium linear alkyl sulfonate. Suitable surfactants for use with the liquid bleach activator in moisture-activated microcapsules are nonionic surfactants, cationic surfactants, amphoteric surfactants, zwitterionic surfactants, and mixtures thereof, as given herein above, preferably nonionic surfactants. Typical nonionic surfactants are ethoxylated aliphatic alcohols and carboxylic acids; polyethylene glycol diesters of fatty acids; ethoxylated alkyl phenols, such as Igepal® surfactants from Rhone-Poulenc; polyethylene glycol- polypropylene glycol block copolymers, such as Pluronic® and Pluronic R® surfactants from BASF; Tetronic® and Tetronic R® surfactants from BASF, ethoxylated branched aliphatic diols, such as Surfynol® surfactants from Air Products; and mixtures thereof. A preferred dispersion aid is fatty acid esters of ethoxylated sorbitans. More preferably said dispersion aid is selected from the group consisting of mixtures of laurate esters of sorbitol and sorbitol anhydrides; mixtures of stearate esters of sorbitol and sorbitol anhydrides; and mixtures of oleate esters of sorbitol and sorbitol anhydrides. Even more preferably said solubilizing aid is selected from the group consisting of Polysorbate 20, which is a mixture of laurate esters of sorbitol and sorbitol anhydrides consisting predominantly of the monoester, condensed with about 20 moles of ethylene oxide; Polysorbate 60 which is a mixture of stearate esters of sorbitol and sorbitol anhydride, consisting predominantly of the monoester. condensed with about 20 moles of ethylene oxide; Polysorbate 80 which is a mixture of oleate esters of sorbitol and sorbitol anhydrides, consisting predominantly of the monoester, condensed with about 20 moles of ethylene oxide; and mixtures thereof. Most preferably, said solubilizing aid is Polysorbate 60. Preferred amphoteric surfactants are the betaines.

When the dispersion aid is present in the cyclodextrin/liquid bleach activator complex, it is typically present at a level of from about 0.02% to about 5%, more preferably from about 0.05% to about 1%, most preferably from about 0.1% to about 0.5%. by weight of the cyclodextrin complex. When the dispersion aid is intimately blended with the liquid bleach activator to be encapsulated, it is typically present at a weight ratio of liquid bleach activator to dispersion aid of from about 100:1 to about 1:10, preferably from about 10:1 to about 1:5, more preferably from about 5:1 to about 1:2.

Builders-Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Inorganic or P-containing detergent builders include, but are not limited to. the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the NaSKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1\cdot y}H_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6 form) is most preferred for use herein.

Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z(zAlO_2)_y]\cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}]\cdot xH_2O$$

wherein x is from about 20 to about 30, especially about 27. This material is known as Zeolite A. Dehydrated zeolites (x=0 –10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful materials. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy4-oxa-1,6-hexanedioates and the related compounds disclosed in U.S. Pat. No. 4,566,984, Bush, issued Jan. 28, 1986. Useful succinic acid builders include the $C_5$–$C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0,200,263, published Nov. 5, 1986.

Other suitable polycarboxylates are disclosed in U.S. Pat. No. 4,144,226, Crutchfield et al. issued Mar. 13, 1979 and in U.S. Pat. No. 3,308,067, Diehl, issued Mar. 7, 1967. See also Diehl U.S. Pat. No. 3,723,322.

Fatty acids. e.g., $C_{12}$–$C_{18}$ monocarboxylic acids, can also be incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Abrasives

An essential component of many solid cleaning compositions is the abrasive material added to facilitate the action of scouring. Abrasive scouring cleansers provide a convenient and useful means for carrying out the sanitizing of toilet bowls and urinals. The particulate abrasive material within such compositions serves to abrade and loosen soil adhering to hard surfaces and further serves to create more intimate contact between hard surface stain and the surfactant and/or bleaching agents also present in the cleansing compositions.

Abrasive cleaners have traditionally contained water-insoluble, relatively hard, particulate mineral material as the abrasive agent. The most common such abrasive agent is finely divided silica sand having particle size varying between about 1 and 300 microns and specific gravity of about 2.1 or higher. While such material is generally very effective in scouring soil and stains from the surfaces being treated, abrasive material of this type tends to be difficult to rinse away from the toilet bowl or urinal surface.

It has been discovered that abrasive compositions of this desired type can be realized by utilizing a particular type of expanded perlite abrasive in combination with the liquid bleach activator/cyclodextrin inclusion complex, source of hydrogen peroxide, surfactants, filler material, and other optional scouring material ingredients listed herein. The abrasive materials suitable to the present invention are those contained in U.S. Pat. No. 4,051,056, Hartman, issued Sep. 27, 1977 and included herein by reference. However, excess cyclodextrin can be suitably added to the cleaning composition to serve as an adjunct abrasive material, preferably in an amount from about 1% to about 30%, more preferably from about 10% toa bout 20% by weight of the composition.

Other Ingredients

A wide variety of other ingredients useful in detergent compositions can be included in the compositions herein, including other active ingredients, carriers, hydrotropes, processing aids, dyes or pigments, solid fillers for bar compositions, etc. Other optional ingredients include enzymes, bleaches, bleach activators, bleach catalysts, photoactivators, dyes, fluorescers, fabric conditioners, hydrolyzable surfactants, optical brighteners, preservatives, anti-oxidants, chelants, stabilizers, anti-shrinkage agents, anti-wrinkle agents, soil release agents, germicides, fungicides. and anti corrosion agents. If high sudsing is desired. suds boosters such as the $C_{10}$–$C_{16}$ alkanolamides can be incorporated into the compositions, typically at 1%–10% levels. The $C_{10}$–$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, soluble magnesium salts such as $MgCl_2$, $MgSO_4$, and the like, can be added at levels of, typically, 0.1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, DeGussa) is admixed with a proteolytic enzyme solution containing 3%–5% of $C_{13-15}$ ethoxylated alcohol (EO 7) nonionic surfactant. Typically, the enzyme/surfactant solution is 2.5 × the weight of silica. The resulting powder is dispersed with stirring in silicone oil (various silicone oil viscosity in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergent compositions.

The detergent compositions herein will preferably be formulated such that, during use in aqueous cleaning operations, the wash water will have a pH of between about 6.5 and about 11, preferably between about 7.5 and 10.5. Laundry products are typically at pH 9–11. Techniques for controlling pH at recommended usage levels include the use of buffers, alkalis, acids, etc., and are well known to those skilled in the art.

RH of the ADD Compositions

Preferred automatic dishwashing detergent compositions herein have a 1% aqueous solution pH of from about 7 to about 13, more preferably from about 8.5 to about 12.5, and most preferably of from greater than about 10.5 to about 12.0.

Highly preferred ADD compositions herein combine the above-identified preferred high-pH range on one hand, for example a pH of greater than about 11, with relatively low total alkalinity on the other, having, for example, an alkalinity no higher than about 9 grams NaOH, or NaOH equivalent, per 100 grams of automatic dishwashing detergent product.

METHODS FOR PREPARING HYDROPHOBIC LIQUID BLEACH ACTIVATOR/ CYCLODEXTRIN COMPLEXES

The present invention is also directed to methods for preparing hydrophobic liquid bleach activator/cyclodextrin inclusion complexes for use in granular or solid cleaning compositions.

The process comprises the steps of:

a) combining a cyclodextrin and a liquid carrier in a vessel. Typically the carrier is water but other liquids and combinations of liquids with water may be used as long as the carrier can be suitably removed in step (e);

b) mixing together the cyclodextrin and the liquid carrier to form a slurry. This mixing step may be carried out in any suitable container, preferably one that allows for variable speed mixing since the initial addition of the cyclodextrin to the liquid carrier may involve folding the solid into the carrier until the carrier sufficiently wets out the cyclodextrin particles;

c) adding to the slurry a sufficient amount of a hydrophobic liquid bleach activator such that the ratio of liquid bleach activator to cyclodextrin is from about 2:1 to about 1:2, preferably from about 1.5:1 to about 1:1.5, more preferably from about 1.25:1 to about 1:1.25, most preferably one mole of liquid bleach activator is used for every mole of cyclodextrin, that is the ratio is 1:1. The preferred hydrophobic liquid bleach activators for use in the process of the present invention are selected from the group consisting of hexanoyl caprolactam, hexanoyl valerolactam, octanoyl caprolactam, octanoyl valerolactam, nonanoyl caprolactam, nonanoyl valerolactam, isononanoyl caprolactam, isononanoyl caprolactam, isononanoyl valerolactam, decanoyl caprolactam, decanoyl valerolactam, undecanoyl caprolactam, undecanoyl valerolactam, 3,5,5-trimethylhexanoyl caprolactam, 3,5,5-trimethylhexanoyl valerolactam, N-octanoyl-N-methyl acetamide, N-nonanoyl-N-methyl acetamide, N-decanoyl-N-methyl acetamide and N-dodecanoyl-N-methyl acetamide and mixtures thereof, d) adding to the activator/cyclodextrin complex a surfactant and mixing to form a paste. This step enhances the formation of the bleach activator/cyclodextrin inclusion complex and solubilization of the activator when released in the aqueous wash solution. Typically the surfactant is an primary linear alkyl sulfate or linear alkyl benzene sulfonate, however, any suitable surfactant that provides a phase change of the suspension to form a paste and improves the solubilization of the bleach activator is operable under the conditions of the present process;

e) removing the liquid carrier from the paste to form a free flowing granule. The removal of the liquid carrier can be accomplished by air drying at ambient temperatures, by air drying at increased temperatures, by drying under vacuum with or without heating, provided the method of drying does not act to de-stabilize the liquid bleach stabilizer/cyclodextrin inclusion complex final product.

Granular Compositions

The hydrophobic liquid bleach activator-containing laundry detergent 20 compositions of the present invention can be used in both low density (below 550 grams/liter) and high density granular compositions in which the density of the granule is at least 550 grams/liter. Granular compositions are typically designed to provide an in the wash pH of from about 7.5 to about 11.5, more preferably from about 9.5 to about 10.5. Low density compositions can be prepared by standard spray-drying processes. Various means and equipment are available to prepare high density compositions. Current commercial practice in the field employs spray-drying towers to manufacture compositions which have a density less than about 500 g/l. Accordingly, if spray-drying is used as part of the overall process, the resulting spray-dried particles must be further densified using the means and equipment described hereinafter. In the alternative, the formulator can eliminate spray-drying by using mixing, densifying and granulating equipment that is commercially available. The following is a nonlimiting description of such equipment suitable for use herein.

Various means and equipment are available to prepare high density (i.e. greater than about 550, preferably greater than about 650, grams/liter or "g/l"), high solubility, free-flowing, granular detergent compositions according to the present invention. Current commercial practice in the field employs spray-drying towers to manufacture granular laundry detergents which often have a density less than about 500 g/l. In this procedure, an aqueous slurry of various heat-stable ingredients in the final detergent composition are formed into homogeneous granules by passage through a spray-drying tower, using conventional techniques, at temperatures of about 175° C. to about 225° C. However, if spray drying is used as part of the overall process herein, additional process steps as described hereinafter must be used to obtain the level of density (i.e., >650 g/l) required by modern compact, low dosage detergent products.

For example, spray-dried granules from a tower can be densified further by loading a liquid such as water or a nonionic surfactant into the pores of the granules and/or subjecting them to one or more high speed mixer/densifiers. A suitable high speed mixer/densifier for this process is a device marketed under the tradename "Lödige CB 30" or "Lödige CB 30 Recycler" which comprises a static cylindrical mixing drum having a central rotating shaft with mixing/cutting blades mounted thereon. In use, the ingredients for the detergent composition are introduced into the drum and the shaft/blade assembly is rotated at speeds in the range of 100–2500 rpm to provide thorough mixing/densification. See Jacobs et al, U.S. Pat. No. 5,149,455, issued Sep. 22, 1992. The preferred residence time in the high speed mixer/densifier is from about 1 to 60 seconds. Other such apparatus includes the devices marketed under the tradename "Shugi Granulator" and under the tradename "Drais K-TTP 80).

Another process step which can be used to densify further spray-dried granules involves grinding and agglomerating or deforming the spray-dried granules in a moderate speed mixer/densifier so as to obtain particles having lower intraparticle porosity. Equipment such as that marketed under the tradename "Lödige KM" (Series 300 or 600) or "Lödige Ploughshare" mixer/densifiers are suitable for this process step. Such equipment is typically operated at 40–160 rpm. The residence time of the detergent ingredients in the moderate speed mixer/densifier is from about 0.1 to 12 minutes. Other useful equipment includes the device which is available under the tradename "Drais K-T 160". This process step which employs a moderate speed mixer/densifier (e.g. Lödige KM) can be used by itself or sequentially with the aforementioned high speed mixer/densifier (e.g. Lödige CB) to achieve the desired density. Other types of granules manufacturing apparatus useful herein include the apparatus disclosed in U.S. Pat. No. 2,306,898, to G. L. Heller, Dec. 29, 1942.

While it may be more suitable to use the high speed mixer/densifier followed by the low speed mixer/densifier, the reverse sequential mixer/densifier configuration is also contemplated by the invention. One or a combination of various parameters including residence times in the mixer/densifiers, operating temperatures of the equipment, temperature and/or composition of the granules, the use of adjunct ingredients such as liquid binders and flow aids, can be used to optimize densification of the spray-dried granules in the process of the invention. By way of example, see the processes in Appel et al, U.S. Pat. No. 5,133,924, issued Jul. 28, 1992 (granules are brought into a deformable state prior to densification), Delwel et al, U.S. Pat. No. 4,637,891, issued Jan. 20, 1987 (granulating spray-dried granules with a liquid binder and aluminosilicate); Kruse et al, U.S. Pat. No. 4,726,908, issued Feb. 23, 1988 (granulating spray-dried granules with a liquid binder and aluminosilicate); and, Bortolotti et al, U.S. Pat. No. 5,160,657, issued Nov. 3, 1992 (coating densified granules with a liquid binder and aluminosilicate).

In those situations in which particularly heat sensitive or highly volatile detergent ingredients are to be incorporated into the final detergent composition, processes which do not include spray drying towers are preferred. The formulator can eliminate the spray-drying step by feeding, in either a continuous or batch mode, starting detergent ingredients directly into mixing/densifying equipment that is commercially available. One particularly preferred embodiment involves charging a surfactant paste and an anhydrous builder material into a high speed mixer/densifier (e.g. Lödige CB) followed by a moderate speed mixer/densifier (e.g. Lödige KM) to form high density detergent agglomerates. See Capeci et al, U.S. Pat. No. 5,366,652, issued Nov. 22, 1994 and Capeci et al, U.S. Pat. No. 5,486,303, issued Jan. 23, 1996. Optionally, the liquid/solids ratio of the starting detergent ingredients in such a process can be selected to obtain high density agglomerates that are more free flowing and crisp.

Optionally, the process may include one or more recycle streams of undersized particles produced by the process which are fed back to the mixer/densifiers for further agglomeration or build-up. The oversized particles produced by this process can be sent to grinding apparatus and then fed back to the mixing/densifying equipment. These additional recycle process steps facilitate build-up agglomeration of the starting detergent ingredients resulting in a finished composition having a uniform distribution of the desired particle size (400–700 microns) and density (>550 g/l). See Capeci et al, U.S. Pat. No. 5,516,448, issued May 14, 1996 and Capeci et al, U.S. Pat. No. 5,489,392, issued Feb. 6, 1996. Other suitable processes which do not call for the use of spray-drying towers are described by Bollier et al, U.S. Pat. No. 4,828,721, issued May 9, 1989; Beerse et al, U.S. Pat. No. 5,108,646, issued Apr. 28, 1992; and, Jolicoeur, U.S. Pat. No. 5,178,798. issued Jan. 12, 1993.

In yet another embodiment, the high density detergent composition of the invention can be produced using a fluidized bed mixer. In this process, the various ingredients of the finished composition are combined in an aqueous slurry (typically 80% solids content) and sprayed into a fluidized bed to provide the finished detergent granules. Prior to the fluidized bed, this process can optionally include the step of mixing the slurry using the aforementioned L ödige CB mixer/densifier or a “Flexomix 160” mixer/ densifier, available from Shugi. Fluidized bed or moving beds of the type available under the tradename “Escher Wyss” can be used in such processes.

Another suitable process which can be used herein involves feeding a liquid acid precursor of an anionic surfactant, an alkaline inorganic material (e.g. sodium carbonate) and optionally other detergent ingredients into a high speed mixer/densifier (residence time 5–30 seconds) so as to form agglomerates containing a partially or totally neutralized anionic surfactant salt and the other starting detergent ingredients. Optionally, the contents in the high speed mixer/densifier can be sent to a moderate speed mixer/densifier (e.g. Lödige KM) for further agglomeration resulting in the finished high density detergent composition. See Appel et al, U.S. Pat. No. 5,164,108, issued Nov. 17, 1992.

EXAMPLE 1

Preparation of nonanoyl caprolactam/beta-cyclodextrin complex

To a 1 liter beaker is charged β-cyclodextrin (373.8 gm) and distilled water (373.8 mL). The combined material is added to a blender mix pot and mixed at the lowest speed from about 3 minutes. Slowly add, while stirring is continued, nonanoyl caprolactam (83.4 gm) over a period of about 4 minutes. This results in a ratio of nonanoyl caprolactam to β-cyclodextrin of 1:1 on a molar basis. Once added, increase the speed of the blender to the next setting and mix for 9 minutes. Sodium linear alkyl sulfonate paste, having an activity of 68%, (0.75 gm) is added and the mixing is continued for an additional 6 minutes. The resulting paste is dried at 120° F. for two days to yield a free flowing granular material that is directly formulatable.

The other liquid bleach activators described herein above can be suitably substituted for nonanoyl caprolactam in the above example.

EXAMPLES 2–7

The following are non-limiting examples of granular laundry detergent compositions formulated with linear alkyl benzene sulfonate (LAS), comprising the liquid bleach activator/cyclodextrin inclusion complexes of the present invention.

TABLE 1

| | weight % | | | | | |
|---|---|---|---|---|---|---|
| Ingredient | 2 | 3 | 4 | 5 | 6 | 7 |
| Sodium $C_{11}$–$C_{13}$ alkyl-benzenesulfonate | 12.6 | 13.3 | 9.4 | 10.6 | 18.0 | 18.0 |
| Sodium $C_{14}$–$C_{15}$ alcohol sulfate | 3.7 | 3.9 | 4.0 | 10.6 | 0.0 | 0.0 |
| Sodium $C_{14}$–$C_{15}$ alcohol ethoxylate (0.5) sulfate | 1.9 | 1.9 | 0.0 | 0.0 | 0.0 | 1.5[7] |
| Sodium $C_{14}$–$C_{15}$ alcohol ethoxylate (6.5) | 0.5 | 0.5 | 0.5 | 1.0 | 0.5 | 0.5 |
| Tallow fatty acid | 0.0 | 0.0 | 0.0 | 1.0 | 0.0 | 0.0 |
| Sodium tripolyphosphate | 0.0 | 39.8 | 0.0 | 0.0 | 22.5 | 22.5 |
| Zeolite A, hydrate (0.1–10 micron size) | 25.0 | 0.0 | 18.2 | 26.0 | 0.0 | 0.0 |
| Sodium carbonate | 22.7 | 12.0 | 22.5 | 15.3 | 13.0 | 13.0 |
| Sodium Polyacrylate (45%) | 3.2 | 0.0 | 2.4 | 3.2 | 1.0 | 1.0 |
| Sodium silicate (1:6 ratio $NaO/SiO_2$) (46%) | 2.3 | 6.2 | 1.9 | 2.5 | 7.9 | 7.9 |
| Sodium sulfate | 10.0 | 10.6 | 7.0 | 14.0 | 15.0 | 17.5 |
| Sodium perborate monohydrate | 1.0 | 1.0 | 5.0 | 1.0 | 2.5 | 2.5 |
| Poly(ethyleneglycol), MW ~4000 (50%) | 1.6 | 0.4 | 0.8 | 1.0 | 0.0 | 0.0 |
| Citric acid | 0.0 | 0.0 | 2.7 | 0.0 | 0.0 | 0.0 |
| Nonyl ester of sodium p-hydroxybenzene-sulfonate | 0.0 | 0.0 | 5.3 | 0.0 | 0.0 | 0.0 |
| Soil release polymer[1] | 1.5 | 0.0 | 0.0 | 0.0 | 0.0 | 0.0 |
| Soil release polymer[2] | 0.0 | 1.5 | 0.0 | 0.0 | 0.15 | 0.2 |
| Soil release polymer[3] | 0.0 | 0.5 | 0.5 | 0.5 | 0.0 | 0.0 |
| Bleach activator[4] | 5.3 | 2.7 | 13.3 | 5.3 | 10.6 | 6.4 |
| Ethoxylated Polyamine[5] | 0.0 | 0.0 | 0.0 | 0.0 | 0.0 | 0.5 |
| Moisture[6] | 7.1 | 3.0 | 5.5 | 6.9 | 6.0 | 6.0 |

1. Soil release polymer according to U.S. Pat. No. 4,968,451, Scheibel et al., issued November 6, 1990.
2. Soil release polymer according to U.S. Pat. No. 5,415,807, Gosselink, Pan, Kellett and Hall, issued May 16, 1995.
3. Soil release polymer according to U.S. Pat. No. 4,702,857, Gosselink, issued October 27, 1987.
4. Liquid bleach activator/cyclodextrin complex according to Example 1.
5. Anti-redeposition Agent; Ethoxylated Polyamine according to U.S. Pat. No. 5,565,145, Watson, et al., issued October 15, 1996.
6. Balance to 100% can, for example, include minors like optical brightener, perfume, suds suppresser, chelant, soil dispersant, protease, lipase, cellulase, chelating agents, dye transfer inhibiting agents, additional water, and fillers, including $CaCO_3$, talc, silicates, etc.
7. Sodium $C_{12}$–$C_{15}$ alcohol ethoxylate (3) sulfate.

EXAMPLES 8–11

Suitable granular laundry detergent compositions comprising the cyclodextrin inclusion complexes of the present invention can be formulated without linear alkyl benzene sulfonates (LAS), for example:

TABLE 2

| | weight % | | | |
|---|---|---|---|---|
| Ingredient | 8 | 9 | 10 | 11 |
| NEODOL 23-9[1] | 3.2 | 3.5 | 0.0 | 1.0 |
| Sodium $C_{14}$–$C_{15}$ alcohol sulfate | 13.5 | 13.3 | 13.0 | 20.0 |
| Sodium $C_{14}$–$C_{15}$ alcohol ethoxylate (0.5) sulfate | 1.9 | 1.8 | 0.0 | 0.0 |
| Sodium $C_{14}$–$C_{15}$ alcohol ethoxylate (6.5) | 0.5 | 0.5 | 0.5 | 1.0 |
| Tallow fatty acid | 0.0 | 0.0 | 0.0 | 1.0 |
| Sodium tripolyphosphate | 0.0 | 39.0 | 0.0 | 0.0 |
| Zeolite A, hydrate (0.1–10 micron size) | 25.5 | 0.0 | 19.0 | 26.5 |
| Sodium carbonate | 23.2 | 11.8 | 22.5 | 15.3 |
| Sodium Polyacrylate (45%) | 3.3 | 0.0 | 2.3 | 3.2 |
| Sodium silicate (1:6 ratio $NaO/SiO_2$) (46%) | 2.3 | 6.1 | 1.9 | 2.5 |
| Sodium sulfate | 10.2 | 10.3 | 7.0 | 14.0 |
| Sodium perborate monohydrate | 1.0 | 1.0 | 5.0 | 1.0 |
| Poly(ethyleneglycol), MW ~4000 (50%) | 1.6 | 0.4 | 0.8 | 1.0 |
| Citric acid | 0.0 | 0.0 | 2.6 | 0.0 |
| Nonyl ester of sodium p-hydroxybenzene-sulfonate | 0.0 | 0.0 | 5.3 | 0.0 |
| Soil release polymer[2] | 1.5 | 0.0 | 0.0 | 0.0 |
| Soil release polymer[3] | 0.0 | 1.4 | 0.0 | 0.0 |
| Soil release polymer[4] | 0.0 | 0.5 | 0.5 | 0.5 |

TABLE 2-continued

| | weight % | | | |
|---|---|---|---|---|
| Ingredient | 8 | 9 | 10 | 11 |
| Bleach activator[5] | 2.7 | 5.3 | 13.3 | 5.3 |
| Moisture[6] | 7.3 | 3.0 | 5.5 | 6.9 |

[1]. As sold by the Shell Oil Co.
[2]. Non-cotton soil release polymer according to U.S. Pat. No. 4,968,451, Scheibel et al., issued November 6, 1990.
[3]. Non-cotton soil release polymer according to U.S. Pat. No. 5,415,807, Gosselink, Pan, Kellett and Hall, issued May 16, 1995.
[4]. Non-cotton soil release polymer according to U.S. Pat. No. 4,702,857, Gosselink, issued October 27, 1987.
[5]. Liquid bleach activator/cyclodextrin complex according to Example 1.
[6]. Balance to 100% can, for example, include minors like optical brightener, perfume, suds suppresser, chelant, soil dispersant, protease, lipase, cellulase, chelating agents, dye transfer inhibiting agents, additional water, and fillers, including $CaCO_3$, talc, silicates, etc.

Examples 12–15

The following fully-formulated solid-form automatic dishwashing detergents are non-limiting examples of the present invention.

TABLE 3

| | weight % | | | |
|---|---|---|---|---|
| Ingredient | 12 | 13 | 14 | 15 |
| Sodium citrate | 15.0 | 15.0 | 15.0 | 15.0 |
| Sodium carbonate | 17.5 | 20.0 | 20.0 | 17.5 |
| Polymeric dispersant[1] | 6.0 | 6.0 | 6.0 | 6.0 |
| Hydroxyethyldiphosphonate (HEDP; acid) | 1.0 | 0.5 | 0.71 | 1.0 |
| Nonionic surfactant[2] | 2.0 | 2.0 | 2.0 | 2.0 |
| Sodium perborate monohydrate | 1.5 | 0.5 | 1.5 | 0.8 |
| Bleach activator[3] | 4.0 | 2.7 | 4.0 | 2.2 |
| DTPMP[4] | 0.1 | — | — | 0.1 |
| Savinase 6.0T (protease) | — | 2.0 | 2.0 | 1.0 |
| Savinase 12T (protease) | 2.2 | — | — | 1.2 |
| Termamyl 60T (amylase) | 1.5 | 1.0 | 1.0 | 2.5 |
| BRITESIL H2O[5] | 8.0 | 8.0 | 8.0 | 8.0 |
| Metasilicate (anhydrous) | 1.1 | — | — | 1.2 |
| Paraffin | 0.5 | — | — | 0.5 |
| Benzotriazole | 0.3 | — | — | 0.3 |
| Sulfate, water, minors | balance | balance | balance | balance |

[1]. Dispersant Polymer: One or more of: Sokolan PA30, BASF Corp., Accusol 480N, Rohm % Haas.
[2]. SLF18, Olin Corp. or Plurafac.
[3]. A liquid bleach activator/beta cyclodextrin inclusion complex according to Example 1.
[4]. Diethylenetriaminepentakis (methylene phosphonic acid).
[5]. PD Corp. (as $SiO_2$).

TABLE 4

The following table lists non-limiting examples of the direct application of the present invention formulated into hard surface scouring cleaners comprising abrasive material

| | weight % | | | |
|---|---|---|---|---|
| Ingredient | 16 | 17 | 18 | 19 |
| Surfactant | 0.25 | 3.5 | 5.5 | 6.5 |
| Sodium perborate monohydrate | 2.2 | 1.0 | 1.2 | 1.2 |
| Bleach activator[1] | 21.3 | 10.0 | 12.8 | 6.4 |
| Tetrapotassium pyrophosphate | 6.0 | — | — | — |
| Tripotassium phosphate | 2.0 | — | — | — |
| Sodium tripolyphosphate | — | — | — | 1.6 |
| Sodium silicate | — | 0.04 | 0.05 | — |
| Sodium acetate | — | — | — | 0.3 |
| Sodium bromide | — | 1.8 | 1.5 | — |
| Perfume | — | 0.28 | 0.1 | — |
| Calcium carbonate | 2.1 | — | — | — |
| Calcium oxide | 2.2 | — | — | — |
| Perlite abrasive | 6.5 | 10.0 | 5.0 | — |
| Sodium hydroxide | 0.8 | 1.6 | 1.8 | 0.8 |
| Dyes | 0.75 | 0.28 | 0.28 | 0.28 |
| Miscellaneous/abrasives | 22.5 | 13.3 | 22.0 | 33.2 |
| Lanolin | — | — | — | 2.1 |
| Carboxymethylcellulose | — | — | — | 2.6 |
| Moisture/distilled water/fillers | balance | balance | balance | balance |

[1]. A liquid bleach activator/beta cyclodextrin inclusion complex according to Example 1.

TABLE 5

The following table lists non-limiting examples of the direct application of the present invention formulated into laundry bars

| | EXAMPLES 20–25 | | | | | |
|---|---|---|---|---|---|---|
| Ingredients | 20 | 21 | 22 | 23 | 24 | 25 |
| NaCFAS ($C_{12}$–$C_{18}$) | 15.75 | 11.20 | 22.5 | 13050 | — | — |
| Na ($C_{12}$–$C_{18}$) LAS | 6.75 | 8.80 | — | — | 15.00 | 21.00 |
| Sodium carbonate | 10.00 | 15.00 | 10.0 | 3.00 | 8.00 | 10.0 |
| DTPP[1] | 0.70 | 0.70 | 0.70 | 0.70 | — | 0.60 |
| PEO-300M[2] | — | — | 0.30 | — | — | 0.30 |
| PEO-600M | — | — | — | 0.20 | 0.20 | — |

TABLE 5-continued

The following table lists non-limiting examples of the direct application of the present invention formulated into laundry bars

| | EXAMPLES 20–25 | | | | | |
|---|---|---|---|---|---|---|
| Ingredients | 20 | 21 | 22 | 23 | 24 | 25 |
| Bentonite clay | — | — | — | 10.0 | — | 5.0 |
| Sokolan CP-5[3] | 0.50 | 0.70 | 0.40 | 1.00 | — | 0.20 |
| TSPP | 7.50 | — | 5.00 | — | — | 5.00 |
| STPP | 7.50 | 10.00 | 5.00 | 15.00 | 5.00 | — |
| Zeolite | 1.25 | 1.25 | 1.25 | 1.25 | — | — |
| Sodium laurate | — | — | — | 9.00 | — | — |
| SRP-A[4] | 0.30 | 0.30 | 0.30 | 0.30 | — | 0.22 |
| Protease enzyme[5] | — | — | .08 | 0.12 | 0.08 | 0.08 |
| Amylase enzyme[6] | — | 0.80 | — | — | — | — |
| Lipase enzyme | — | — | — | 0.10 | 0.10 | — |
| Cellulase enzyme[7] | — | — | — | 0.15 | — | 0.15 |
| Ethoxylated Polyamine[8] | — | — | 0.50 | — | 0.50 | — |
| Sodium perborate | 1.0 | 1.0 | 5.0 | 1.0 | 2.5 | 2.5 |
| Bleach activator[9] | 5.3 | 2.7 | 13.3 | 5.3 | 10.6 | 6.4 |
| Moisture, minors[10] | balance | balance | balance | balance | balance | balance |

[1]. Sodium diethylenetriamine penta (phosphonate).
[2]. PEO is poly(ethyleneoxide) having a molecular weight as indicated.
[3]. Sokolan CP-5 is maleic-acrylic copolymer.
[4]. Soil release polymer according to U.S. Pat. No. 5,415,807, Gosselink, Pan, Kellett and Hall, issued May 16, 1995.
[5]. Protease activity at 1 Au/gm stock.
[6]. Amylase activity at 100,000 amu/gm stock.
[7]. Carezyme ® cellulase, supplied by Novo Nordisk, activity at 5000 Cevu/gm stock.
[8]. Anti-redeposition agent; ethoxylated polyamine according to U.S. Pat. No. 5,565,145 Watson et al., issued October 15, 1996.
[9]. Liquid bleach activator/cyclodextrin complex according to Example 1.
[10]. Includes from about 2% to about 8% water (including water of hydration), sodium sulfate, and calcium carbonate.

What is claimed is:

1. A bleach containing granular laundry detergent composition comprising:

a) from about 0.01% by weight, of a bleaching system comprising:

i) a moisture-activated hydrophobic liquid bleach activator delivery system, said delivery system comprising one or more cellular matrix microcapsules comprised of a polysaccharide and polyhydroxy compound encapsulating said activator; and ii) a source of hydrogen peroxide; wherein said moisture-activated hydrophobic liquid bleach activator delivery system has a molar ratio of liquid bleach activator to cellular matrix microcapsules of from about 1.5:1 to about 1:2 and said cellular matrix microcapsules have a particle size of from about 5 microns to about 500 microns;

b) from about 0.01% by weight, of a detersive surfactant, said detersive surfactant selected from the group consisting of anionic surfactants, nonionic surfactants, and mixtures thereof; and c) the balance carriers and other adjunct materials, said adjunct ingredients being selected from the group consisting of builders, optical brighteners, bleach boosters, dye transfer agents, dispersents, soil release agents, suds suppressers, chelants, proteases, lipases, cellulases, dyes, perfumes, colorants, filler salts, hydrotropes, and mixtures thereof.

2. A composition according to claim 1 wherein the hydrophobic liquid bleach activator has the formula:

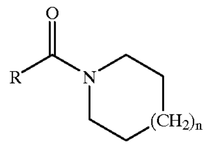

wherein R is $C_1$–$C_{11}$ linear or branched alkyl; n is from 0 to 4; or the formula:

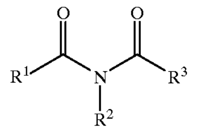

wherein $R^1$ is a $C_7$–$C_{13}$ linear or branched chain saturated or unsaturated alkyl group; and $R^2$ is a $C_1$–$C_2$ alkyl group; and mixtures thereof.

3. A composition according to claim 1 wherein said hydrophobic liquid bleach activator is selected from the group consisting of hexanoyl caprolactam, hexanoyl valerolactam, octanoyl caprolactam, octanoyl valerolactam, nonanoyl caprolactam, nonanoyl valerolactam, isononanoyl caprolactam, isononanoyl caprolactam, isononanoyl valerolactam, decanoyl caprolactam, decanoyl valerolactam, undecanoyl caprolactam, undecanoyl valerolactam, 3,5,5-trimethylhexanoyl caprolactam, 3,5,5-trimethylhexanoyl valerolactam, N-octanoyl-N-methyl acetamide, N-nonanoyl-N-methyl acetamide, N-decanoyl-N-methyl acetamide and N-dodecanoyl-N-methyl acetamide, and mixtures thereof.

4. A composition according to claim 1 wherein the delivery system is a hydrophobic liquid bleach activator/cellular matrix microcapsule complex, said complex comprising:

a) a hydrophobic liquid bleach activator; and b) cellular matrix microcapsules; wherein said cellular matrix microcapsules have a particle size of from about 20 microns to about 200 microns.

5. A composition according to claim 1 comprising from about 1% to about 30% by weight, of a bleaching system.

6. A composition according to claim 5 comprising from about 3% to about 25% by weight, of a bleaching system.

7. A hard surface cleaning composition comprising:

a) from about 0.01% by weight, of a bleaching system comprising:

i) a moisture-activated hydrophobic liquid bleach activator delivery system, said delivery system comprising one or more cellular matrix microcapsules comprised of a polysaccharide and polyhydroxy compound encapsulating said activator; and ii) a source of hydrogen peroxide; wherein said moisture-activated hydrophobic liquid bleach activator delivery system has a molar ratio of liquid bleach activator to cellular matrix microcapsules of from about 1.5:1 to about 1:2 and said cellular matrix microcapsules have a particle size of from about 5 microns to about 500 microns;

b) from about 0.01% by weight, of a detersive surfactant, said detersive surfactant being selected from the group consisting of anionic surfactants, nonionic surfactants, and mixtures thereof, preferably linear alkyl benzene sulfonate, primary alkyl sulfate, secondary alkyl sulfate, or alkyl alkoxy sulfate;

c) optionally an abrasive material; and d) the balance carriers and other adjunct materials, said adjunct ingredients being selected from the group consisting of builders, bleach boosters, dyes, perfumes, colorants, filler salts, and mixtures thereof.

8. A composition according to claim 7 comprising from about 1% to about 50% by weight, of a bleaching system.

9. A composition according to claim 8 comprising from about 5% to about 40% by weight, of a bleaching system.

10. An automatic dishwasher detergent composition comprising:

a) from about 0.01% by weight, of a bleaching system comprising:

i) a moisture-activated hydrophobic liquid bleach activator delivery system, said delivery system comprising one or more cellular matrix microcapsules comprised of a polysaccharide and a polyhydroxy compound encapsulating said activator; and ii) a source of hydrogen peroxide; wherein said moisture-activated hydrophobic liquid bleach activator delivery system has a molar ratio of liquid bleach activator to cellular matrix microcapsules of from about 1.5:1 to about 1:2 and said cellular matrix microcapsules have a particle size of from about 5 microns to about 500 microns;

b) from about 0.01% by weight, of a detersive surfactant; and c) the balance carriers and other adjunct materials, said adjunct ingredients being selected from the group consisting of builders, optical brighteners, bleach boosters, dye transfer agents, dispersents, soil release agents, suds suppressers, chelants, proteases, lipases, cellulases, dyes, perfumes, colorants, filler salts, hydrotropes, and mixtures thereof.

11. A composition according to claim 10 comprising from about 1% to about 30% by weight, of a bleaching system.

12. A composition according to claim 11 comprising from about 3% to about 25% by weight, of a bleaching system.

13. A bleach-containing laundry bar composition comprising:

a) from about 0.01% by weight, of a bleaching system comprising:

i) a moisture-activated hydrophobic liquid bleach activator delivery system, said delivery system comprising one or more cellular matrix microcapsules comprised of a polysaccharide and a polyhydroxy compound encapsulating said activator; and ii) a source of hydrogen peroxide;

wherein said moisture-activated hydrophobic liquid bleach activator delivery system has a molar ratio of liquid bleach activator to cellular matrix microcapsules of from about 1.5:1 to about 1:2 and said cellular matrix microcapsules have a particle size of from about 5 microns to about 500 microns;

b) from about 0.01% by weight, of a detersive surfactant, said detersive surfactant being selected from the group consisting of anionic surfactants, nonionic surfactants, and mixtures thereof; and c) the balance carriers and other adjunct materials, said adjunct ingredients being selected from the group consisting of builders, optical brighteners, bleach boosters, dye transfer agents, dispersents, soil release agents, suds suppressers, chelants, proteases, lipases, cellulases, dyes, perfumes, colorants, filler salts, hydrotropes, and mixtures thereof.

14. A composition according to claim 13 comprising from about 1% to about 30% by weight, of a bleaching system.

15. A process for making a bleaching system having a liquid bleach activator, said bleaching system compatible for use in granular cleaning compositions, comprising the steps of:

a) combining a cellular matrix microcapsule comprised of a polysaccharide and a polyhydroxide compound and a liquid carrier in a vessel;

b) mixing together the cellular matrix microcapsule and the liquid carrier to form a slurry;

c) adding to the slurry a sufficient amount of a hydrophobic liquid bleach activator such that the molar ratio of cellular matrix microcapsule to liquid bleach activator is from about 2:1 to about 1:2, and mixing to form an activator/cellular matrix microcapsule complex;

d) optionally adding to the activator/cellular matrix microcapsule complex a surfactant and mixing to form a paste; and e) removing the liquid carrier from the paste to form a free flowing granule.

16. A process according to claim 15 wherein the hydrophobic liquid bleach activator in step (c) has the formula:

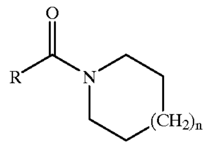

wherein R is $C_1$–$C_{11}$ linear or branched alkyl; n is from 0 to 4.

17. A process according to claim 15 wherein the granules obtained in step (e) have a particle size less than about 1200 microns.

18. A process according to claim 15 wherein the molar ratio of liquid bleach activator to cellular matrix microcapsule is from about 1:1 to about 1:100.

19. A process according to claim 15 wherein said cellular matrix microcapsule has a particle size of from about 20 microns to about 200 microns.

20. A process according to claim 15 wherein said hydrophobic liquid bleach activator in step (c) is selected from the group consisting of hexanoyl caprolactam, hexanoyl valerolactam, octanoyl caprolactam, octanoyl valerolactam, nonanoyl caprolactam, nonanoyl valerolactam, isononanoyl caprolactam, isononanoyl caprolactam, isononanoyl valerolactam, decanoyl caprolactam, decanoyl valerolactam, undecanoyl caprolactam, undecanoyl valerolactam, 3,5,5-trimethylhexanoyl caprolactam, 3,5,5-trimethylhexanoyl valerolactam, and mixtures thereof.

* * * * *